US009023955B2

(12) United States Patent
Gaeta et al.

(10) Patent No.: US 9,023,955 B2
(45) Date of Patent: May 5, 2015

(54) HIGH-PERFORMANCE RESIN FOR ABRASIVE PRODUCTS

(71) Applicant: Saint-Gobain Abrasives, Inc., Worcester, MA (US)

(72) Inventors: Anthony C. Gaeta, Lockport, NY (US); William C. Rice, Medway, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

(21) Appl. No.: 14/329,306

(22) Filed: Jul. 11, 2014

(65) Prior Publication Data
US 2014/0318025 A1 Oct. 30, 2014

Related U.S. Application Data

(60) Continuation of application No. 13/301,544, filed on Nov. 21, 2011, now Pat. No. 8,802,791, which is a division of application No. 11/476,320, filed on Jun. 28, 2006, now Pat. No. 8,062,394.

(60) Provisional application No. 60/695,233, filed on Jun. 29, 2005.

(51) Int. Cl.
| C08F 283/00 | (2006.01) |
| B24D 3/28 | (2006.01) |
| C08G 8/28 | (2006.01) |
| C08L 61/14 | (2006.01) |
| B24D 3/34 | (2006.01) |
| C08G 8/10 | (2006.01) |
| C08G 12/32 | (2006.01) |
| C08G 12/36 | (2006.01) |
| C08L 61/06 | (2006.01) |
| C08L 61/24 | (2006.01) |
| C08L 61/28 | (2006.01) |
| C09G 1/16 | (2006.01) |

(52) U.S. Cl.
CPC ........ B24D 3/285 (2013.01); C08G 8/28 (2013.01); C08L 61/14 (2013.01); C09G 1/16 (2013.01); B24D 3/344 (2013.01); C08G 8/10 (2013.01); C08G 12/32 (2013.01); C08G 12/36 (2013.01); C08L 61/06 (2013.01); C08L 61/24 (2013.01); C08L 61/28 (2013.01)

(58) Field of Classification Search
CPC ............ C08G 8/10; C08G 8/28; C08L 61/06; C08L 61/14; C09G 1/16
USPC ......... 525/398, 401, 480, 502, 505, 509, 518; 528/230, 487
See application file for complete search history.

(56) References Cited

U.S. PATENT DOCUMENTS

| 2,646,415 | A | 7/1953 | Patrick et al. |
| 2,958,593 | A | 11/1960 | Hoover et al. |
| 3,310,601 | A | 3/1967 | Acetis et al. |
| 3,553,283 | A | 1/1971 | Doss |
| 3,849,949 | A | 11/1974 | Steinhauser et al. |
| 3,857,876 | A | 12/1974 | Jones et al. |
| 3,873,502 | A | 3/1975 | Hickner et al. |
| 3,916,067 | A | 10/1975 | Jones et al. |
| 4,076,489 | A | 2/1978 | Schroeter et al. |
| 4,130,550 | A | 12/1978 | Kitsuda et al. |
| 4,289,814 | A | 9/1981 | Jinkins et al. |
| 4,360,557 | A | 11/1982 | Miller |
| 4,550,147 | A | 10/1985 | Oohara |
| 4,578,425 | A | 3/1986 | Santorelli |
| 4,609,581 | A | 9/1986 | Ott |
| 4,788,083 | A | 11/1988 | Dammann et al. |
| 4,800,685 | A | 1/1989 | Haynes, Jr. |
| 4,802,896 | A | 2/1989 | Law et al. |
| 4,936,916 | A | 6/1990 | Shinmitsu et al. |
| 4,956,129 | A | 9/1990 | Scher et al. |
| 4,991,362 | A | 2/1991 | Heyer et al. |

(Continued)

FOREIGN PATENT DOCUMENTS

| CN | 1130888 | 6/2001 |
| EP | 1518873 A2 | 3/2005 |

(Continued)

OTHER PUBLICATIONS

Notification of Transmittal of the International Preliminary Report on Patentability, mailed Oct. 26, 2007, PCT/US2006/025133, 7 pages.
Notification of Transmittal of the International Search Report and the Written Opinion of the International Searching Authority, or the Declaration, Nov. 8, 2006, PCT/US2006/025133, 8 pages.
Second Office Action Notification from the Chinese Patent Office dated Jun. 5, 2010 for Chinese Patent Application No. 200680029072.2.
Patent Approval and Rejection Examination Notification from the Taiwanese Patent Office dated Jun. 7, 2010 for Taiwanese Patent Application No. 095123355.
Notice of Preliminary Rejection from the Intellectual Property Office dated Sep. 23, 2009 for Korean Patent Application No. 10-2009-7005865.

(Continued)

*Primary Examiner* — Robert Jones, Jr.
(74) *Attorney, Agent, or Firm* — Abel Law Group, LLP; Joseph P. Sullivan

(57) ABSTRACT

An abrasive product includes a plurality of abrasive particles and a resin cured with a polythiol group. A method of preparing the abrasive product includes contacting the plurality of abrasive particles with a curable composition that includes a resin and a polythiol group, and curing the curable composition to produce the abrasive product. A method of abrading a work surface includes applying an abrasive product to a work surface in an abrading motion to remove a portion of the work surface. A curable composition includes a formaldehyde resin and a polythiol group. A formaldehyde resin is crosslinked by a polythiol group. A method of crosslinking the formaldehyde resin includes reacting the polythiol group with the formaldehyde resin.

14 Claims, 11 Drawing Sheets

(56) References Cited

U.S. PATENT DOCUMENTS

| | | | |
|---|---|---|---|
| 6,024,824 | A | 2/2000 | Krech |
| 6,086,795 | A | 7/2000 | Hatton |
| 6,653,371 | B1 | 11/2003 | Burns et al. |
| 6,835,220 | B2 | 12/2004 | Swei et al. |
| 6,949,129 | B2 | 9/2005 | Simon |
| 7,288,608 | B2 | 10/2007 | Bowman et al. |
| 8,062,394 | B2 | 11/2011 | Gaeta et al. |
| 2002/0016379 | A1 | 2/2002 | Gaeta et al. |
| 2002/0062531 | A1 | 5/2002 | Oh |
| 2002/0077037 | A1 | 6/2002 | Tietz |
| 2002/0136773 | A1 | 9/2002 | Scher et al. |
| 2003/0171078 | A1 | 9/2003 | Ryoke et al. |
| 2003/0192258 | A1 | 10/2003 | Simon |
| 2004/0131691 | A1 | 7/2004 | Casson et al. |
| 2005/0085167 | A1 | 4/2005 | Swei et al. |
| 2006/0223903 | A1 | 10/2006 | Cao et al. |
| 2006/0265966 | A1 | 11/2006 | Rostal et al. |
| 2007/0011951 | A1 | 1/2007 | Gaeta et al. |
| 2012/0130014 | A1 | 5/2012 | Gaeta et al. |

FOREIGN PATENT DOCUMENTS

| | | | |
|---|---|---|---|
| FR | 2835256 | | 8/2003 |
| JP | 59001546 | | 1/1984 |
| JP | 63095253 | | 4/1988 |
| JP | 01126385 | | 5/1989 |
| JP | 09-054943 | | 2/1997 |
| JP | 2001107089 | A | 4/2001 |
| JP | 2002-239923 | | 8/2002 |
| JP | 2003-291068 | A | 10/2003 |
| JP | 2005515908 | | 6/2005 |
| JP | 2005536545 | A | 12/2005 |
| KR | 100904628 | | 6/2009 |
| TW | I225888 | | 1/2005 |
| WO | 9507796 | A1 | 3/1995 |
| WO | 9912707 | A1 | 3/1999 |
| WO | 02/062531 | A1 | 8/2002 |
| WO | 03/064111 | A1 | 8/2003 |
| WO | 2004017734 | A1 | 3/2004 |
| WO | 2007/005452 | A1 | 1/2007 |

OTHER PUBLICATIONS

Office Action and Search Report from the Intellectual Property Office dated Jan. 27, 2010 for Taiwan Patent Application No. 095123355.
Notice of Preliminary Rejection from the Korean Patent Office dated Jan. 21, 2009 for Korean Patent Application No. 10-2007-7030912.
Notice of Preliminary Rejection from the Korean Patent Office dated Jul. 23, 2008 for Korean Patent Application No. 10-2007-7030912.
First Office Action from the Patent Office of the State Intellectual Property Office of the People's Republic of China dated Nov. 20, 2009 for Chinese Patent Application No. 200680029072.2.
Office Action and Search Report from Chilean Patent Office dated Dec. 22, 2009 for Chilean Patent Application No. N165406.
Office Action from the European Patent Office dated Oct. 21, 2008 for European Patent Application No. 06 785 721.9.
Database WPI Week 198407, Derwent Publications Ltd., London, GB; AN 1984-039670 XP002404009.
Examination Report from the Intellectual Property Office of New Zealand dated Dec. 22, 2009 for New Zealand Patent Application No. 564192.
Examination Report from the Intellectual Property Office of New Zealand dated Oct. 23, 2009 for New Zealand Patent Application No. 564192.
Official Action from the Indonesian Patent Office dated Mar. 17, 2009 for Indonesian Patent Application No. W-00 2007 04314.
Bruno Bock Thio-Chem: Thioglycolic Acid 3-Mercaptopropionic Acid Thiolactic Acid Polythiols [online], Apr. 13, 2007, pp. 1-4. Retrieved from the internet URL: http://www.brunobock.org/modules.phpname=Content&pa=showpage&pid=6.
Bruno Bock Thio-Chem: Safely Data Sheet for Thiocure® ETTMP 1300, Last revised May 31, 2008, Printed Aug. 7, 2008, pp. 1-5.
Examiner's First Report from the Australian Patent Office dated Sep. 2, 2009 for Australian Patent Application No. 2006266124.
Office Action from the Canadian Patent Office dated Aug. 12, 2009 for Canadian Patent Application No. 2,612,234.
First Examination Report from the Indian Patent Office dated Jan. 5, 2010 for Indian Patent Application No. 2199MUMNP2007.
Cardarelli, F.; Materials Handbook: A Concise Desktop Reference, 2000, p. 286.
Harper, C.A., et al.; Plastics Materials and Processes, 2003, p. 30.
Holbrow, C.H., et al.; Modern Introductory Physics, 2010, p. 308.

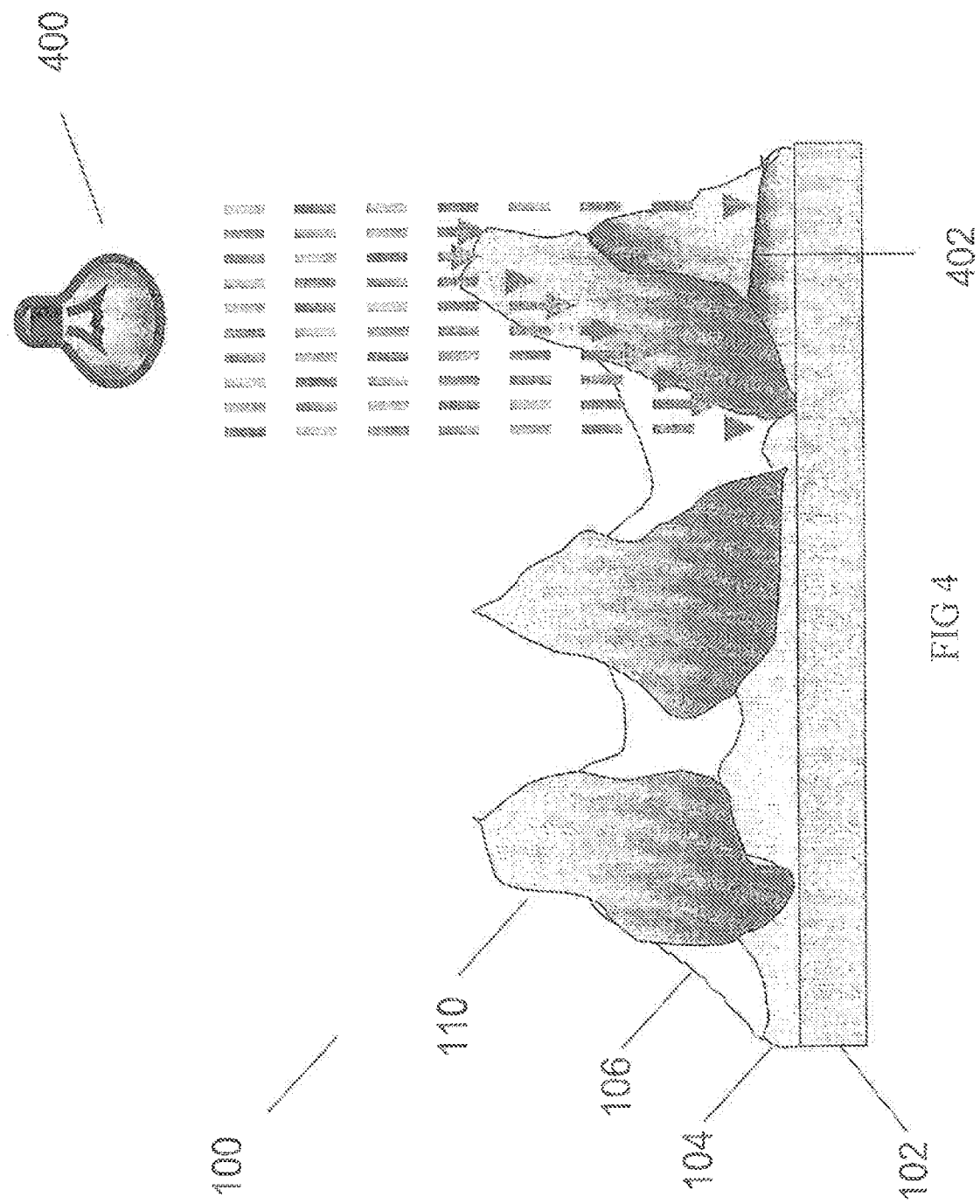

HIGH-PERFORMANCE RESIN FOR ABRASIVE PRODUCTS

CROSS-REFERENCE TO RELATED APPLICATION(S)

This is a continuation application claiming priority to divisional application U.S. patent application Ser. No. 13/301,544, filed Nov. 21, 2011, entitled "HIGH-PERFORMANCE RESIN FOR ABRASIVE PRODUCTS," naming inventors Anthony C. Gaeta and William C. Rice, now allowed, which is a divisional application of U.S. patent application Ser. No. 11/476,320, filed Jun. 28, 2006, entitled "HIGH-PERFORMANCE RESIN FOR ABRASIVE PRODUCTS," naming inventors Anthony C. Gaeta and William C. Rice, which claims priority from U.S. Provisional Patent Application No. 60/695,233, filed Jun. 29, 2005, entitled "HIGH-PERFORMANCE RESIN FOR ABRASIVE PRODUCTS," naming inventors Anthony C. Gaeta and William C. Rice, which application is incorporated by reference herein in its entirety.

BACKGROUND

Many abrasive products include abrasive particles in a binder, for example, abrasive particles bound to paper in sandpaper, or a bonded abrasive article such as a grinding wheel, formed of abrasive particles and a binder.

Desirable characteristics for such binders include binding strength, toughness, flexibility, ease of curing, ease of additive incorporation such as colorants, minimal cost, and the like. Abrasive binders having one or more such characteristics can exhibit longer abrading lifetime, better abrading performance, decreased random scratch formation on a workpiece due to particle movement, and the like.

Numerous binders have been employed or attempted in abrasive products, for example, phenolic resins, aminoplast resins having pendant α, β-unsaturated carbonyl groups, urethane resins, epoxy resins, urea-formaldehyde resins, isocyanurate resins, melamine-formaldehyde resins, acrylate resins, acrylated isocyanurate resins, acrylated urethane resins, acrylated epoxy resins, bismaleimide resins, hide glue, cellulosics, latices, casein, soy proteins, sodium alginate, polyvinyl alcohol, polyvinylacetate, polyacrylester, and polyethylene vinylacetate, polystyrene-butadiene, mixtures thereof, and the like.

However, there is still a need in the art for abrasive binders with improved properties.

SUMMARY OF THE INVENTION

It is now found that polythiol additives provide improved properties for abrasive resin binders.

An abrasive product includes a plurality of abrasive particles and a resin cured with a polythiol group.

A method of preparing the abrasive product includes contacting the plurality of abrasive particles with a curable composition that includes a resin and a polythiol group, and curing the curable composition to produce the abrasive product.

A method of abrading a work surface includes applying an abrasive product to a work surface in an abrading motion to remove a portion of the work surface. The abrasive product includes an abrasive material embedded in a crosslinked resin, the crosslinked resin including crosslinks by a polythiol crosslinking group.

A formaldehyde resin is crosslinked by the polythiol group.

A curable composition includes the formaldehyde resin and the polythiol crosslinker.

A method of crosslinking the formaldehyde resin includes reacting the polythiol crosslinker with the formaldehyde resin.

In particular embodiments, a crosslinked resin is selected from phenol-formaldehyde, melamine-formaldehyde, and urea-formaldehyde, the resin crosslinked by a polythiol group having at least three thiol moieties, the polythiol group being at least about 1% of the crosslinked resin by weight, wherein compared to the same resin without the polythiol group, the crosslinked resin satisfies at least one criterion selected from the group consisting of the crosslinked resin has increased transparency, the crosslinked resin has an increased storage modulus, the crosslinked resin has an increased loss modulus, and the crosslinked resin has a decreased tan .delta. In particular embodiments, an abrasive product comprises abrasive particles embedded in this resin.

The disclosed cured resins, such as crosslinked resins, are color stable compared to other resins. For example, the typical darkening observed in phenolic resins can be mitigated with polythiol crosslinking, without the use of melamine, allowing transparent resins capable of being used in applications that benefit from transparency, for example, use with colorants, or the like.

The disclosed resins have improved mechanical properties, for example, increased average storage modulus, increased average loss modulus decreased average tan δ, and the like. The improved mechanical properties can lead to improved applications such as in abrasive products. For example, in coated abrasives such as sandpaper, the disclosed resins can result in a product that retains abrasive grains better leading to decreased random scratch formation, is more flexible leading to less cracking/embrittlement which can improve the lifetime and performance of the product, or can sustain a greater normal cutting force for the same lifetime, and the like.

In addition, the use of disclosed cured resins, such as crosslinked resins, can significantly improve a coated abrasive's flexibility while simultaneously improving the interfacial adhesion, for example, between the make and backing layer.

Without wishing to be bound by theory, it is believed that the polythiol can improve the properties of the cured resins, such as crosslinked resins, in several ways. The polythiol is believed to act as a chain transfer agent, which can slow down high polymerization rates of resins when reacted with the polythiol. Curing of some resins without the polythiol is believed to proceed immediately, or nearly so, to high-molecular weight, "vitrified" polymers that can have poor conversion percentages and poor mechanical properties. The polythiol is believed to result in higher percent conversion of some resin monomers, resulting in intermolecular chain extension, avoiding some of the vitrification effects and leading to better properties. Also, it is believed that rotational freedom around the —S— moiety can relieve stress around abrasive grains, which can improve mechanical properties.

BRIEF DESCRIPTION OF THE DRAWINGS

FIG. 1 is a diagram of a coated abrasive product 100 that includes a support substrate 102, such as sandpaper, emery cloth, or the like.

FIG. 3A contains a phenolic resin binder with no polythiol crosslinker. FIG. 3B contains the phenolic resin binder crosslinked with 10% by weight of the polythiol pentaerythritol tetra-(3-mercaptopropionate).

FIG. 4 shows a "grain shadowing" effect which is believed to occur during ultraviolet curing of coated abrasive 100.

FIG. 9A is a photograph of a coated abrasive with (TMPTA/ICTA resin) crosslinked with the polythiol pentaerythritol tetra-(3-mercaptopropionate); FIG. 9B a photograph of an abrasive having the same resin without the polythiol.

DETAILED DESCRIPTION

Figure 1:
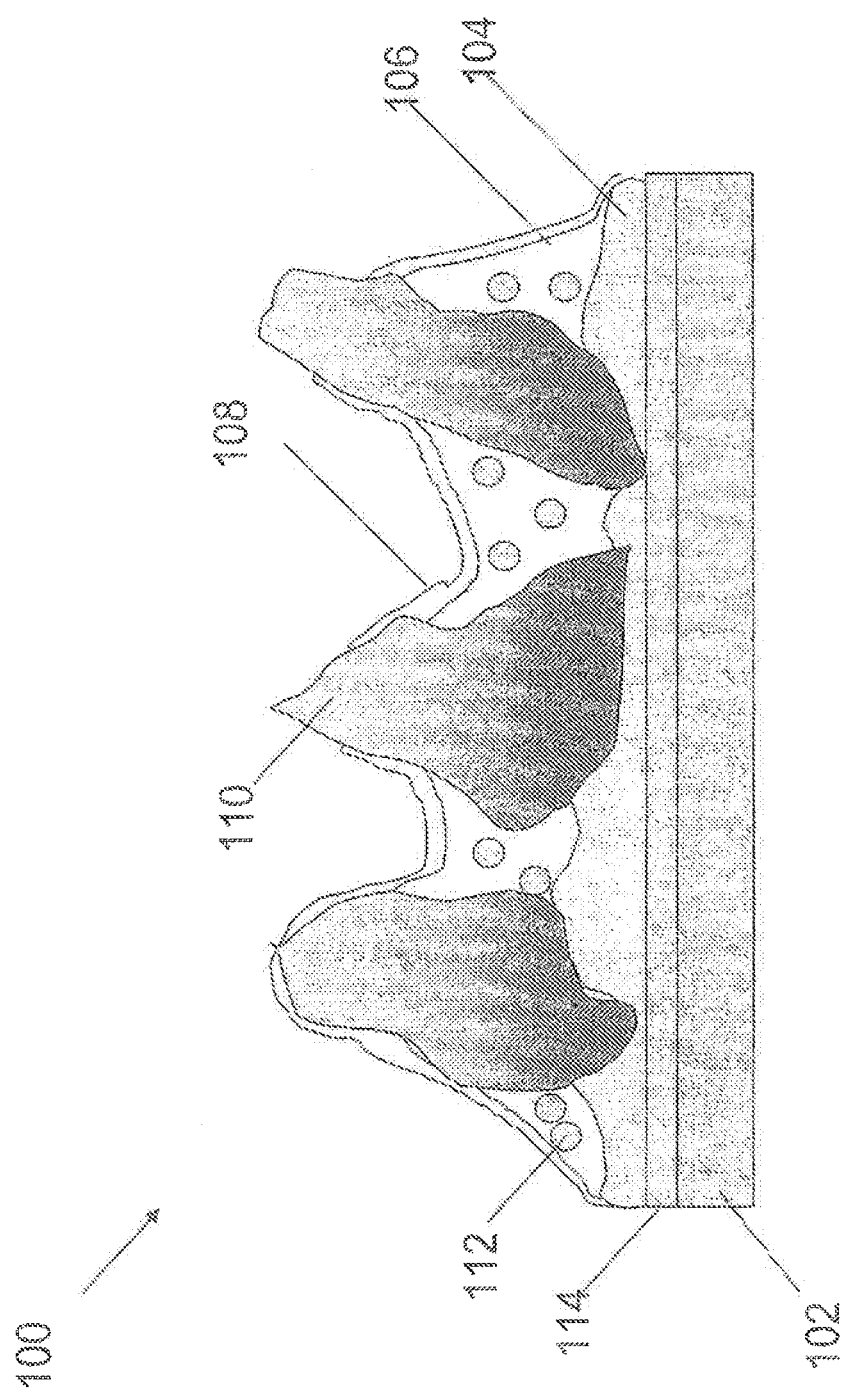

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The disclosed embodiments are generally related to polythiol groups in combination with polymers and resins, in particular employed as binders incorporated into abrasive products.

In one aspect, the present invention is directed to an abrasive product that includes a resin cured with a polythiol group. In some embodiments, the cured resin includes a resin crosslinked with the polythiol group.

As used herein, an uncured or uncrosslinked "resin" is a composition for curing or crosslinking comprising one or more components selected from monomers, oligomers, and polymers, and may optionally contain other additives such as colorants, stabilizers, plasticizers, fillers, solvents, antiloading agents, or the like. Generally, a resin includes a mixture of partially polymerized components that harden upon curing, which is typically the result of a crosslinking reaction. The cured or uncrosslinked resin can be cured by initiation with light, electron beam radiation, acid, base, heat, combinations thereof, or the like to form the crosslinked resin. Typically in the invention, the uncured or uncrosslinked resins, such as aldehyde resins, are cured or crosslinked with a polythiol group.

As used herein, a "polythiol crosslinker" or "polythiol group" is an organic moiety includes at least two thiol (—SH) groups; when crosslinked, the thiols are in the form of a sulfur ether group —S—. Polythiols can be oligomers or polymers having 2, 5, 10, 20, 50, 100 or more thiol groups. Generally, a polythiol group comprises from 2 to 6 thiol groups. In one embodiment, the polythiol group is a non-polymeric organic compound. As used herein, the "non-polymeric" organic compound means that the organic compound includes either no repeating unit, or not more than 10 repeats (preferably not more than 5 repeats) of a repeating unit which a polymer typically includes. In a specific embodiment, the polythiol group is a trithiol or tetrathiol. In a more specific embodiment, the trithiol or tetrathiol is non-polymeric. In a preferred embodiment, the polythiol group can be selected from trimethylolpropane tri(3-mercaptopropionate), trimethylolpropane tri(3-mercaptoacetate), pentaerythritol tetra(3-mercaptopropionate), pentaerythritol tetra(3-mercaptoacetate), polyol-3-mercaptopropionates, polyol-3-mercaptoacetates, polyester-3-mercaptopropionates, polyester-3-mercaptoacetates, ETTMP 1300 (Chemical Abstract Service Registry No. 345352-19-4), other polyolesterthiols, other polyolthiols, or the like. In a more preferred embodiment, the polythiol includes pentaerythritol tetra-(3-mercaptopropionate) $(C(CH_2OOCCH_2CH_2—SH)_4)$. Numerous polythiols are commercially available from BRUNO BOCK Chemische Fabrik GmbH & Co. KG, Marschacht Germany.

In a specific embodiment, the resin to be cured or crosslinked includes an aldehyde resin, preferably a formaldehyde resin, crosslinked with a polythiol group. As used herein, the uncured or uncrosslinked "aldehyde resin" includes polymeric or partially polymerized compositions that are formed by condensation reactions of an aldehyde with nucleophiles, such as amino compounds or phenolic compounds, generating water as a byproduct. As used herein, the "amino compound" means a monomeric compound having at least one amino group $(—NH_2)$. Examples of the amino compounds that can be employed in the invention include urea; aminotriazines such as melamine; and mixtures thereof. As used herein, the "phenolic compound" means a monomeric compound having at least one phenolic unit. Examples of the phenolic compounds that can be employed in the invention include phenol; alkyl phenols, such as cresols (e.g., o-cresol, m-cresol and p-cresol), xylenols (e.g., 2,4-xylenol), cardinols, ethyl phenols, propyl phenols, hexyl phenols, nonyl phenols or cahew nut shell liquid; alkenyl phenols, such as isopropenyl phenol; polyhydric phenols, such as resorcin; aryl phenols, such as phenylphenol; a phenolic diol, such as $CH_2(C_6H_4OH)_2$ or $C(CH_3)_2(C_6H_4OH)_2$; and mixtures thereof. As used herein, the "aldehyde" means an organic compound having at least one aldehyde group or a functional group that can be converted to an aldehyde group, which is capable of reacting with a phenolic compound as described above. Examples of such aldehydes include formaldehyde; formaldehyde yielding materials such as paraformaldehyde; acetaldehyde; furfural; butyraldehyde; and mixtures thereof.

In a more specific embodiment, the resin to be cured or crosslinked includes a phenol-aldehyde, a melamine-aldehyde, a urea-aldehyde resin, or a mixture thereof. In an even more specific embodiment, the resin to be cured or crosslinked includes a phenol-formaldehyde, a melamine-formaldehyde, a urea-formaldehyde resin, or a mixture thereof. In some preferred embodiments, the resin to be cured or crosslinked includes a phenol-formaldehyde resin. Specific examples of such phenol-formaldehyde that can be employed in the invention can be found in the art, for example, in U.S. Pat. Nos. 4,130,550; 4,289,814; and 4,578,425, the entire teachings of which are incorporated herein by reference.

In another specific embodiment, the resin to be cured or crosslinked includes an thiol-ene polymer wherein the thiol-ene polymer is cured or crosslinked with the polythiol group, or in other words the thiol moieties of the thiol-ene polymer include the thiol groups of the polythiol group. In particular embodiments, the resin to be cured or crosslinked includes trimethylolpropane triacrylate or tris (2-hydroxy ethyl) isocyanurate triacrylate.

In yet another embodiment, the resin to be cured or crosslinked includes or is further combined with an optionally crosslinked or crosslinkable component selected from phenolic resins, aminoplast resins having pendant $\alpha$, $\beta$-unsaturated carbonyl groups, urethane resins, epoxy resins, urea-formaldehyde resins, isocyanurate resins, melamine-formaldehyde resins, acrylate resins, acrylated isocyanurate resins, acrylated urethane resins, acrylated epoxy resins, bismaleimide resins, hide glue, cellulosics, latices, casein, soy proteins, sodium alginate, polyvinyl alcohol, polyvinylacetate, polyacrylester, and polyethylene vinylacetate, polystyrene-butadiene, and mixtures thereof.

Generally, the polythiol group can form from at least about 1% to about 99% of the cured or crosslinked resin by weight, typically at least about 5%, more typically from about 5% to about 50%, particularly from about 5% to about 40%, or specifically from about 10% to about 40%.

The abrasive articles of the invention include coated abrasive articles, lapping or structured abrasive articles, bonded abrasive articles, and nonwoven abrasive articles.

In one embodiment, the abrasive articles of the invention are coated abrasive articles. Typically, the coated abrasive articles of the invention include a support substrate having a first major surface and a second major surface; an abrasive material, such as a plurality of abrasive particles; a resin binder which adheres the plurality of abrasive particles to the first major surface of the substrate, and optionally a peripheral coat comprising an antiloading component. The abrasive material, such as abrasive grains, particles or agglomerate thereof, can be present in one layer (e.g., resin-abrasive layer) or in two layers (e.g., make coat and size coat) of the coated abrasive articles. The coated abrasive articles of the invention include a resin binder cured or crosslinked with a polythiol, as described above, in at least one layer selected from the group consisting of binder-abrasive layer, backsize coat, presize coat, make coat, size coat and supersize coat. Such resin binder can generally be formed by curing a resin binder composition that includes an uncrosslinked resin or a partially crosslinked resin, and a polythiol group, as described above.

In some specific embodiments, the coated abrasive articles of the invention include a support substrate having a first major surface and a second major surface; a plurality of abrasive particles; a resin binder which adheres the plurality of abrasive particles to the first major surface of the substrate, which can be termed a make coat. In one example, such a make coat can be formed by impregnating the support substrate with a resin binder without abrasive grains. Optionally, depending upon their specific applications, the coated abrasive products can further include other coats, for example, a size coat, a supersize coat, or the like. In these embodiments, abrasive materials can be applied separately by gravity, electrostatic deposition or in air stream, or as slurry together with the polyurethane adhesive compositions.

In other specific embodiments, the support substrate may be impregnated with a resin-abrasive slurry that includes an abrasive material, such as abrasive particles, and a resin binder, to form a binder-abrasive layer, depending upon the required aggressiveness of the finished coated abrasive tools, as described above.

The suitable support substrates for the coated abrasive articles of the invention include any number of various materials conventionally used as substrates in the manufacture of coated abrasives, such as paper, cloth, film, polymeric foam, fiber, vulcanized fiber, woven and nonwoven materials, metal, wood, plastic, ceramic, or the like, or a combination of two or more of these materials or treated versions thereof. The substrate may also be a laminate of paper/film, cloth/paper, film/cloth, or the like. Substrates can have varying degrees of flexibility, from relatively flexible thin paper, film, cloth, or the like, to relatively rigid metal, ceramic, wood, or the like. The choice of substrate material will depend on the intended application of the abrasive article. The strength of the substrate should be sufficient to resist tearing or other damage in use, and the thickness and smoothness of the substrate should allow achievement of the product thickness and smoothness desired for the intended application.

The substrate in a coated abrasive article may have an optional saturant/size coat, a presize coat and/or a backsize coat. Such coats can be employed to seal the substrate and/or to protect the yarn or fibers in the substrate. If the substrate is a cloth material, at least one of these coats may be required. The addition of the presize coat or backsize coat may additionally result in a "smoother" surface on either the front and/or the back side of the substrate.

Additionally, an antistatic material may be included in any of these cloth treatment coats. The addition of an antistatic material can reduce the tendency of the coated abrasive article to accumulate static electricity when sanding wood or wood-like materials. Additional details concerning antistatic substrates and substrate coats (treatments) can be found in, for example, U.S. Pat. Nos. 5,108,463; 5,137,542 (Buchanan, et al.); U.S. Pat. No. 5,328,716 (Buchanan); and U.S. Pat. No. 5,560,753 (Buchanan, et al.).

The substrate may also be a fibrous reinforced thermoplastic, for example, as disclosed in U.S. Pat. No. 5,417,726 (Stout, et al.), or an endless spliceless belt, for example, as disclosed in U.S. Pat. No. 5,573,619 (Benedict, et al.). Likewise, the substrate may be a polymeric substrate having hooking stems projecting therefrom, for example, as disclosed in U.S. Pat. No. 5,505,747 (Chesley, et al.). Similarly, the substrate may be a loop fabric, for example, as described in U.S. Pat. No. 5,565,011 (Follett, et al.).

In some instances, it may be preferred to incorporate a pressure sensitive adhesive onto the back side of the coated abrasive such that the resulting coated abrasive can be secured to a back up pad. Representative examples of pressure sensitive adhesives suitable for this invention include latex crepe, rosin, acrylic polymers and copolymers, including polyacrylate ester, e.g., polybutylacrylate, vinyl ethers, e.g., polyvinyl n-butyl ether, alkyd adhesives, rubber adhesives, e.g., natural rubber, synthetic rubber, chlorinated rubber, and mixtures thereof. A preferred pressure sensitive adhesive is an isooctylacrylate:acrylic acid copolymer.

The coated abrasive can be in the form of a roll of abrasive discs, as described in U.S. Pat. No. 3,849,949 (Steinhauser, et al.). The coated abrasive may be converted into a variety of different shapes and forms such as belts, discs, sheets, tapes, daisies and the like. The belts may contain a splice or a joint, alternatively the belts may be spliceless such as that taught in U.S. Pat. No. 5,573,619 (Benedict, et al.).

Alternatively, the coated abrasive may contain a hook and loop type attachment system to secure the coated abrasive to the back up pad. The loop fabric may be on the back side of the coated abrasive with hooks on the back up pad. Alternatively, the hooks may be on the back side of the coated abrasive with the loops on the back up pad.

A hook and loop type attachment system is further described in U.S. Pat. No. 4,609,581 (Ott), U.S. Pat. No. 5,254,194 (Ott, et al.) and U.S. Pat. No. 5,505,747 (Chesley, et al.). Alternatively, the make coat precursor may be coated directly onto the loop fabric, for example, as disclosed in U.S. Pat. No. 5,565,011 (Follett, et al.).

It is also feasible to adhere the abrasive particles to both a major or working surface and the opposite surface of a substrate. The abrasive particles can be the same or different from one another. In this aspect, the abrasive article is essentially two sided; one side can contain a plurality of abrasive particles which are different from a plurality of abrasive particles on the other side. Alternatively, one side can contain a plurality of abrasive particles having a different particle size than those on the other side. In some instances, this two sided abrasive article can be used in a manner in which both sides of the abrasive article abrade at the same time. For example, in a small area such as a corner, one side of the abrasive article can abrade the top workpiece surface, while the other side can abrade the bottom workpiece surface.

Nonwoven abrasives are included within the scope of the invention. Nonwoven abrasives are described generally in U.S. Pat. No. 2,958,593 (Hoover, et al.) and U.S. Pat. No. 4,991,362 (Heyer, et al.).

Bonded abrasive articles are also within the scope of the invention. A bonded abrasive article typically includes a resin binder which adheres abrasive particles together in the form of a molded product, e.g., a grinding wheel, a sharpening stone, or the like. The bonded abrasive article can consist of the abrasive and the resin cured with the polythiol group, described above, or can optionally be bonded or molded to a support, such as a handle, an axel, a wheel, or the like. Bonded abrasive articles are generally described in U.S. Pat. No. 4,800,685 (Haynes). In accordance with the present invention, an antiloading component is present in a peripheral coating over at least a portion of the resin binder or in the matrix of the bonded abrasive articles.

FIG. 1 is a diagram of a coated abrasive product 100 that includes a support substrate 102, such as paper. The resin cured with a polythiol group, as described above, can be present in one or more coats or layers such as a make coat 104, a size coat 106, a supersize coat 108 at the support substrate 102, or the like. Typically, the cured resin can bind the abrasive particles 110 at the support substrate to form an abrasive coating at the support substrate. The coated abrasive can optionally include an optional filler 112.

The substrate 102 can be rigid or flexible, porous or non-porous, and the like. For example, in various embodiments the support substrate can be a lofty, nonwoven web; a rigid substrate; a flexible substrate having a major surface; or the like. In particular embodiments, the support substrate is flexible, and the cured resin substantially conforms to the flexure of the substrate.

In some cases, supersize coat 108 can be deposited with or without a binder. Generally, the function of supersize coat 108 is to place on a surface of coated abrasive materials an additive that provides special characteristics, such as enhanced grinding capability, surface lubrication, anti-static properties or anti-loading properties. Examples of suitable grinding aids are those that include KBF.sub.4. Examples of suitable lubricants for supersize coat 108 include lithium stearate and sodium laurel sulfate. Examples of suitable anti-static agent include alkali metal sulfonates, tertiary amines and the like. Examples of suitable anti-loading agents include metal salts of fatty acids, for example, zinc stearate, calcium stearate and lithium stearate and the like. Anionic organic surfactants can also be used effective anti-loading agents. A variety of examples of such anionic surfactants and antiloading compositions including such an anionic surfactant are described in U.S. Patent Application Publication No. 2005/0085167 A1, the entire teachings of which are incorporated herein by reference. Other examples of suitable anti-loading agents include inorganic anti-loading agents, such as metal silicates, silicas, metal carbonates and metal sulfates. Examples of such inorganic anti-loading agents can be found in WO 02/062531 and U.S. Pat. No. 6,835,220, the entire teachings of which are incorporated herein by reference.

In particular embodiments, the abrasive product can include an optional compliant energy dispersing layer 114, which can be between the support substrate 102 and the abrasive coating 104 (as shown) or the support substrate 102 can be between the abrasive coating 104 and compliant energy dispersing layer 114. In some embodiments, the support substrate can be made of a material that provides both the support substrate function and the compliant energy dispersing function in a single layer, e.g., an elastomeric polymer film, or the like. The compliant energy dispersing layer is believed to at least in part mitigate the effects of abrading action force which is believed to tend to cause the abrasive particles to be released from the cured or crosslinked resin binder. Thus, a product with a compliant energy dispersing layer compared to an otherwise identical product without such a layer can have improved abrasion performance, improved abrasion lifetime, or the like.

The abrasive product can include a colorant, for example, dyes or pigments. Generally, a portion of the colorant can be visible through the cured resin, such as the crosslinked resin, for example, in some embodiments, a portion of the colorant is included in the cured resin, in an optional support substrate, and/or in a coating between the optional support substrate and the cured resin. In particular embodiments, the colorant can include organic polycyclic dyes, organic monoazo dyes, organic diazo dyes, organometal complexes, inorganic pigments such as metal oxides or complexes. Dye can fall into Perinone, anthraquinone, azo dye complexes and thioindigoid.

A fluorescent colorant is a dye or pigment containing a fluorescent organic molecule. Detailed descriptions of fluorescent colorants can be found in Zollinger, H., "Color Chemistry: Synthesis, Properties, and Applications of Organic Dyes and Pigments", $2^{nd}$ Ed., VCH, New York, 1991, the entire teachings of which are incorporated herein by reference. As used herein, a fluorescent colorant can be, for example, a xanthene, thioxanthene, fluorene (e.g., fluoresceins, rhodamines, eosines, phloxines, uranines, succineins, sacchareins, rosamines, and rhodols), napthylamine, naphthylimide, naphtholactam, azalactone, methine, oxazine, thiazine, benzopyran, coumarin, aminoketone, anthraquinone, isoviolanthrone, anthrapyridone, pyranine, pyrazolone, benzothiazene, perylene, or thioindigoid. More preferably, a fluorescent colorant is selected from the group consisting of xanthenes, thioxanthenes, benzopyrans, coumarins, aminoketones, anthraquinones, isoviolanthrones, anthrapyridones, pyranines, pyrazolones, benzothiazenes, thioindigoids and fluorenes. Most preferably, the fluorescent colorant is a thioxanthene or thioxanthene.

One skilled in the art knows that for many commercially available colorants, the specific chemical structure of individual derivatives within a class, e.g., thioxanthene derivatives, may not be publicly available. Thus, specific fluorescent colorants are typically referred to by Colour Index (C.I.) name, as defined in "Colour Index International", 4$^{th}$ Ed. American Association of Textile Chemists and Colorists, Research Triangle Park, N.C., 2002. The Colour Index is also available online at www.colour-index.org. The entire teachings of the Colour Index are incorporated herein by reference.

Examples of preferred fluorescent colorants include C.I. Solvent Orange 63 (Hostasol Red GG, Hoechst AG, Frankfurt, Germany), C.I. Solvent Yellow 98 (Hostasol Yellow 3G, Hoechst AG, Frankfurt, Germany), and C.I. Solvent Orange 118 (FL Orange SFR, Keystone Aniline Corporation, Chicago, Ill.).

The amount of colorant that can be employed depends on the particulars of the intended use, the characteristics of the colorant, the other components in the composition, and the like. One skilled in the art will know how to judge these details to determine the amount of colorant for a particular use. Typically, the amount of colorant will be a weight fraction of the total colorant composition of between about 0.01 and about 2%, more preferably between about 0.05 and about 0.5%, and most preferably, about 0.2%.

In specific embodiments, the colorant is red, orange, yellow, green, blue, indigo, or violet. In specific embodiments, the colorant is fluorescent, for example, fluorescent red, fluorescent orange (blaze orange), fluorescent yellow, fluorescent green, or the like. In some preferred embodiments, the colorant is fluorescent orange (blaze orange).

In various embodiments, particularly in some embodiments including the presence of a colorant, the cured or crosslinked resin does not include melamine.

In various embodiments, the colorant can be employed to identify the abrasive product, e.g., for commercial branding, for usage indication such as wet, dry, wood, metal, or the like, or for identification of grit size, or the like In various embodiments, the colorant can be formed as a printed pattern, for example, to show a logo, an identifying description, a part number, a usage instruction, a safety warning, a wear indicator, a swarf loading indicator, or the like. For example, an abrasive loaded with swarf or an abrasive that is worn can be less effective, thus making a wear indicator or swarf loading indicator useful for indicating to a user that a change in abrasive to improve effectiveness. As used herein, "swarf" refers to abraded workpiece material that can "load" or remain in contact with the abrasive, tending to reduce the effectiveness of the abrasive.

In some embodiments, the cured resin can be cured, e.g., crosslinked, by a photoinitiator having, at a wavelength of 350 nm or longer, an absorption value greater than 0.1, generally greater than 0.15, typically greater than 0.2, more typically greater than 0.25, or particularly greater than 0.3.

Typically, the absorption value at a wavelength 350 nm or longer is over a wavelength range of at least about 10 nm, more typically at least about 25 nm, particularly at least about 40 nm, or in specific embodiments about 50 nm. The wavelength range can be located beginning at 350 nm or greater, typically located between 350 nm and 800 nm, more typically between 350 nm and 500 nm, or in some embodiments between 350 nm and 450 nm. In particular embodiments, the wavelength range can be located between 350 nm and 400 nm, typically beginning at 350 nm.

In some embodiments, the cured resin can be cured, e.g., crosslinked, by a photoinitiator selected from bis-acylphosphine oxide and α-hydroxyketone.

In some embodiments, the abrasive product includes abrasive grains that can be, at least in part, transparent to ultraviolet light, e.g., having, at a wavelength of 350 nm or longer, an absorption value less than 0.9, generally less than 0.8, typically less than 0.7, more typically less than 0.6, or particularly less than 0.5. Typically, the absorption value at a wavelength 350 nm or longer is over a wavelength range of at least about 10 nm, more typically at least about 25 nm, particularly at least about 40 nm, or in specific embodiments about 50 nm.

Likewise, in some embodiments, the abrasive product includes a support substrate that can be transparent to ultraviolet light.

Also, in various embodiments, the cured or crosslinked resin and/or the abrasive product can include an ultraviolet transparent filler e.g., a filler that transmits more ultraviolet light than standard opaque fillers such as calcium carbonate and silica. In particular embodiments, the ultraviolet transparent filler is aluminum trihydrate.

In various embodiments, the abrasive products of the invention can have improved properties, particularly in comparison to a product that is otherwise identical.

In some embodiments, the cured resins of the invention, such as the crosslinked resins, transmit more visible light compared to a resin that is otherwise identical but is not cured with a polythiol group. As used herein, "visible light" is the range of wavelengths from about 400 nm to about 800 nm. The transparency of the cured resin can be measured using a standard visible spectrometer on an appropriately prepared standard sample. For example, two samples formed as identically dimensioned thin films can be compared and the respective percent transmittance values measured.

In some embodiments, the cured resins of the invention, such as the crosslinked resins, can have a decreased average tan .delta. in a temperature range from about −150 degrees C. to 250 degrees C. compared to a resin that is otherwise identical but is not cured with a polythiol group.

In some embodiments, the abrasive products of the invention can exhibit decreased random scratch formation compared to an abrasive product that is otherwise identical except the cured resin, i.e., the product includes an otherwise identical resin but not cured with a polythiol.

In some embodiments, an abrasive product of the invention, including the resin cured with the polythiol group, has increased flexibility, for example by at least about 5% or by at least about 10%, compared to an abrasive product that is otherwise identical except the cured resin, i.e., the product includes an otherwise identical resin but not cured with a polythiol. Flexibility can be measured by suitable methods known in the art, for example, by the use of a Frank Stiffness meter available from Karl Frank in Germany or Gurley Precision Instruments in U.S.A. Typically, flexibility test with such a Frank Stiffness meter measures the amount of force required to bend a sample over a fixed radius to a standard angle, such as between 10 degrees to 60 degrees in 5 degree increments. This can be done in both wrap and weft directions of the sample. The slope of a plot of % force (y-axis) versus angle (x-axis) for each sample yields what is known as the as the "Flex Slope." The higher the flex slope generally indicates a stiffer product.

In yet some embodiments, in an abrasive product of the invention that includes the resin cured with a polythiol group, such as the resin crosslinked with a polythiol group, the cured resin provides increased interfacial adhesion strength, for example by at least about 5% or by at least about 10%, compared to an otherwise identical resin but not cured with a polythiol. Interfacial adhesion strength (or peel force) can be determined by suitable methods known in the art, for example, through the use of an Instron Tensile tester. For example, in such a test using an Instron Tensile tester, the backing material of a coated abrasive product that includes a make coat including the crosslinked resin is bonded to another member of essentially equal stiffness. The force required to adhesively separate the make coat layer from the backing material is measured. The ratio of the peel force to flex slope is generally a measure of the adhesive strength of the make coat to the backing material, where greater values represented greater adhesion.

The coated abrasive products of the invention can be used for sanding, grinding or polishing various surfaces of, for example, steel and other metals, wood, wood-like laminates, plastics, fiberglass, leather or ceramics.

In another aspect, the present invention includes a curable composition that includes a formaldehyde resin and a polythiol group. Feature and examples, including preferred examples, of the formaldehyde resin and the polythiol group are as described above. In some embodiments, the curable composition further include the thiol-ene polymer described above, wherein the thiol-ene polymer can be cured, such as crosslinked, with the polythiol group. In other embodiments, the curable composition further includes or is further combined with an optionally crosslinked or crosslinkable component selected from phenolic resins, aminoplast resins having pendant α, β-unsaturated carbonyl groups, urethane resins, epoxy resins, urea-formaldehyde resins, isocyanurate resins, melamine-formaldehyde resins, acrylate resins, acrylated isocyanurate resins, acrylated urethane resins, acrylated epoxy resins, bismaleimide resins, hide glue, cellulosics, latices, casein, soy proteins, sodium alginate, polyvinyl alcohol, polyvinylacetate, polyacrylester, and polyethylene vinylacetate, polystyrene-butadiene, and mixtures thereof. Optionally, the curable compositions of the invention can further include colorants, fillers and additives, depending upon their specific applications. Examples of the colorants, fillers and additives are as described above.

The present invention also includes a formaldehyde resin crosslinked by a polythiol group. Feature and examples, including preferred examples, of the formaldehyde resin and the polythiol group are as described above.

EXEMPLIFICATION

Example 1

Preparation of Crosslinked Phenol Resins

Crosslinked resins for the following examples were prepared by combining a standard commercially available (e.g., Oxychem, Borden, Bakelite-Hexion-, Durez and Dynea) phenol formaldehyde resole resin with the polythiol pentaerythritol tetra-(3-mercaptopropionate) as a percent of total weight ranging among 0%, 5%, 10%, and 20% by weight. The mixture was first dried for 2 hours at 200° F. and then cured at 250° F. for 5 hours to cure, for example crosslink, the resin.

Coated abrasives for the following examples were prepared by combining one of the above uncrosslinked resins with epoxy acrylate resin coated at 1.6 lbs ream (23.7 gsm) abrasive grains (P180 grit BFRPL aluminum oxide) and applying to a 5-mil polyethylene tereptalate surface treated film in a continuous coating process. The coated mixture was cured as above to crosslink the resin, thus fixing the abrasive coat to the substrate. Other optional additives were added as noted in particular examples.

Example 2

The Disclosed Crosslinked Phenol Resins Improve Transparency

Figure 2:
FIG. 2 is a photograph showing samples of phenolic resin with 0%, 5%, 10%, and 20% by weight of the polythiol pentaerythritol tetra-(3-mercaptopropionate).

FIG. 2 is a photograph showing samples of phenolic resin with 0%, 5%, 10%, and 20% by weight of the polythiol pentaerythritol tetra-(3-mercaptopropionate). As can be seen, transparency of samples of phenolic resin with 0%, 5%, 10%, and 20% by weight of the polythiol pentaerythritol tetra-(3-mercaptopropionate) increased with the increase of the percentage of polythiol, suggesting that the percentage of polythiol correlates with increasing transparency. For example, the sample with 0 wt % of the polythiol pentaerythritol tetra-(3-mercaptopropionate) was almost black, while the sample with 20 wt % of the polythiol pentaerythritol tetra-(3-mercaptopropionate) was very bright yellow-orange.

Figures 3A, 3B:
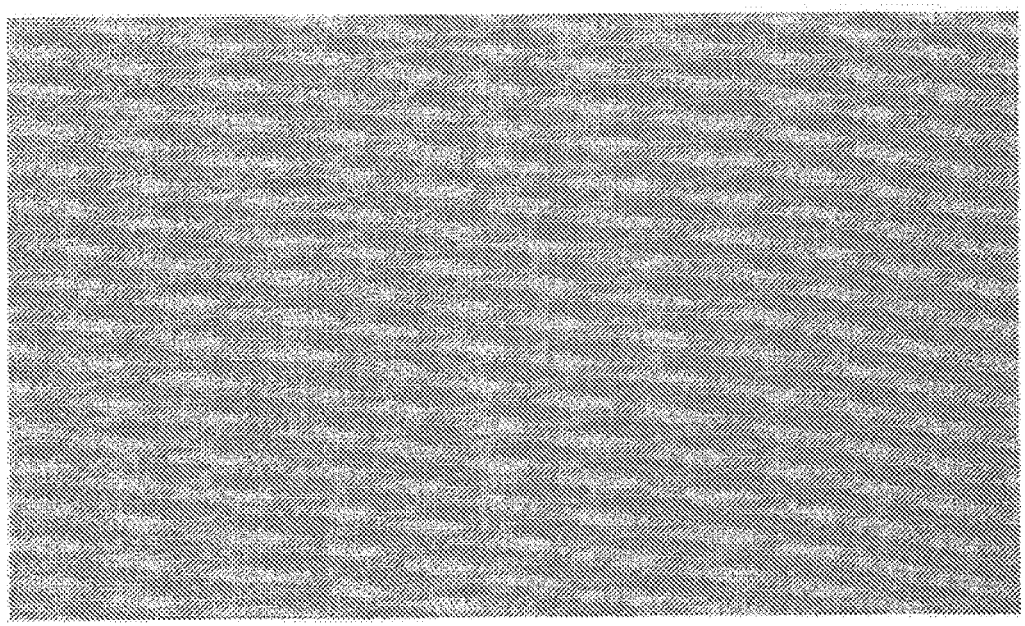
FIGS. 3A and 3B shows two otherwise identical coated abrasives containing a fluorescent orange dye.

FIGS. 3A and 3B shows two otherwise identical coated abrasives containing a fluorescent orange dye. FIG. 3A contains a phenolic resin binder cured without the polythiol group. FIG. 3B contains the phenolic resin binder cured with 10% by weight of the polythiol pentaerythritol tetra-(3-mercaptopropionate). As can be seen in FIGS. 3A and 3B, the coated abrasive with the phenolic resin binder cured without the polythiol group was much darker than the coated abrasive with the phenolic resin binder cured with the polythiol group.

Example 3

The "Grain Shadowing" Effect is Overcome by the Disclosed Abrasives

Certain resins can be cured with ultraviolet light irradiation when photoinitiators are employed. FIG. 4 shows a "grain shadowing" effect which is believed to occur during ultraviolet curing of coated abrasive 100. This effect is believed to impair the curing and thus the performance of abrasives bound with such resins. The short-wavelength ultraviolet light 402 can be obscured by abrasive grains 110, which can shadow portions of the resin in make coat 104 and size coat 106 in region 404 shadowed by the grain, preventing it from curing properly and binding grains 104 to substrate 102. Without wishing to be bound by theory, in various embodiments, it is believed that the "grain shadowing" effect can be mitigated by employing a photoinitiator which has an absorption in a wavelength region where the abrasive grains are at least partially transparent, employing ultraviolet transparent fillers such as aluminum trihydrate which can increase scattering and/or diffusion of light to reduce shadowing, employing a photoinitiator that has an absorbance at longer wavelength where the longer wavelength light diffuses more readily around the abrasive particles to reduce shadowing, employing ultraviolet transparent substrate in coated abrasives whereby the resin can be cured by ultraviolet light directed at the other side of the substrate from the coating being cured, or the like.

Example 4

Figure 5:
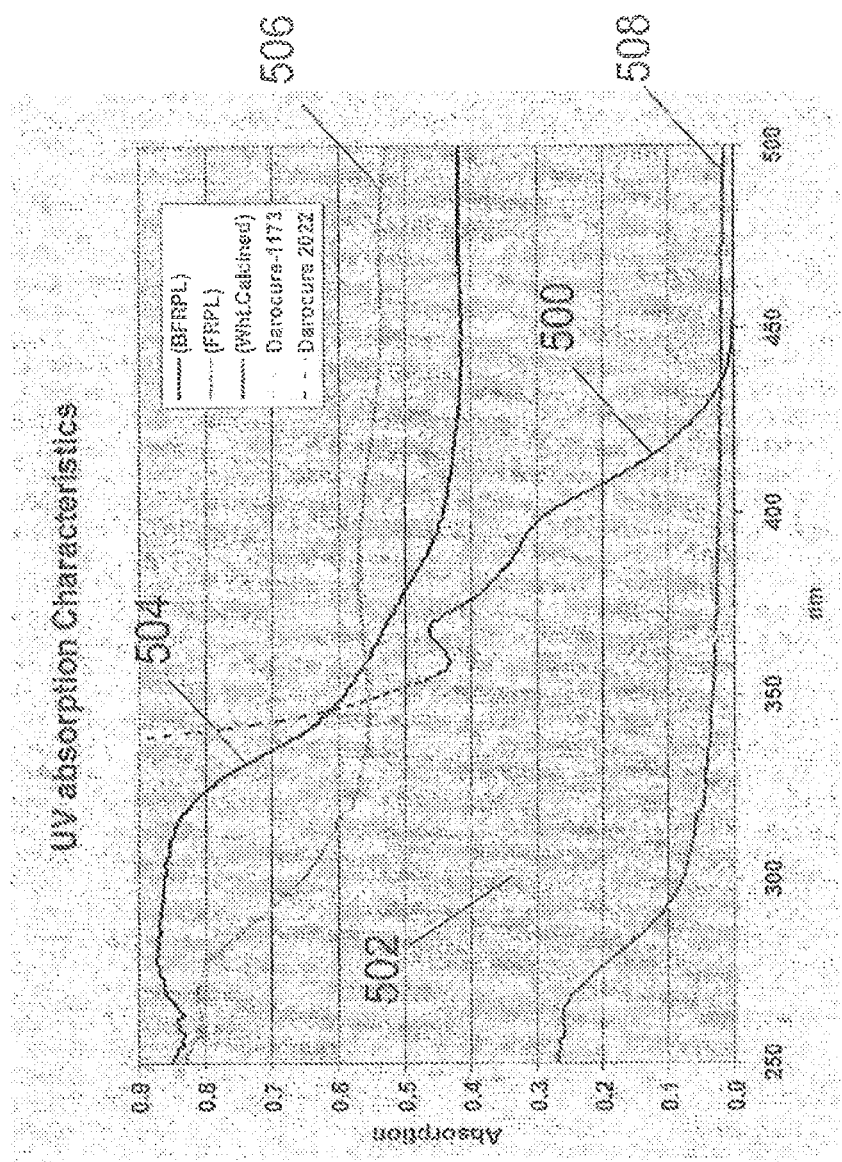
FIG. 5 is a graph of the ultraviolet absorbance of a long wavelength photoinitiator of the invention 500, a short-wavelength initiator 502, and three different abrasive grains 504, 506, and 508.

The Photoinitiators Employed in the Disclosed Abrasives Absorb Light Transmitted by the Abrasive Grains, Improving Curing FIG. 5 is a graph of the ultraviolet absorbance of a long wavelength photoinitiator of the invention 500, a short-wavelength initiator 502, and three different abrasive grains 504, 506, and 508. As can be seen, if short-wavelength initiator 502 is employed, there can be significant shadowing by the abrasive grains, particularly grain 504. By employing long wavelength photoinitiator 500, the system can be irradiated with light in a wavelength region above the major absorbance of the grain, e.g., 350 nanometers for grain 504, where photoinitiator 500 has greater absorbance than short-wavelength initiator 502. Also, the abrasive grains can have comparatively lower absorption than in the absorption band of short-wavelength initiator 502, particularly grain 504.

Example 5

Thiol Crosslinked Resins have Improved Mechanical Properties

Samples of cured polymer for mechanical analysis were prepared by mixing a 70/30 ratio of trimethylolpropane triacrylate/tris (2-hydroxy ethyl) isocyanurate triacrylate or TMPTA/ICTA resin (Sartomer 368D, Sartomer, Exton, Pa.) with photoinitiator, aluminum trihydrate filler, pentaerythritol tetra-(3-mercaptopropionate), and then casting films on untreated Mylar followed by ultraviolet curing in a Fusion lab unit (Fusion UV Systems, Inc, Gaithersburg, Md.) containing both a 600 w/inch and 300 w/inch power supply utilizing a "V" and "D" bulbs respectively to cure the samples @30 FPM. The samples were removed from the Mylar film and trimmed and cleaned to provide samples suitable to dynamic mechanical analysis (DMA) testing (~1/16" thick×1/4" wide× 1" long).

A sinusoidal force was applied to the above samples and the resulting sinusoidal deformation was monitored. The ratio of the dynamic stress to the dynamic strain yields the complex modulus, E*, which can be further broken down to yield the storage modulus, E', and the loss modulus, E". The storage modulus refers to the ability of a material to store energy and can be related to the stiffness of the material. The loss modulus can represent the heat dissipated by the sample as a result of the material's given molecular motions and can reflect the damping characteristics of the polymer. The ratio of the loss and storage modulus is the value tan .delta. Because of the viscoelastic nature of polymers, these viscoelastic properties (E', E" and tan δ) can be a function of temperature as well as time.

Figure 6A:
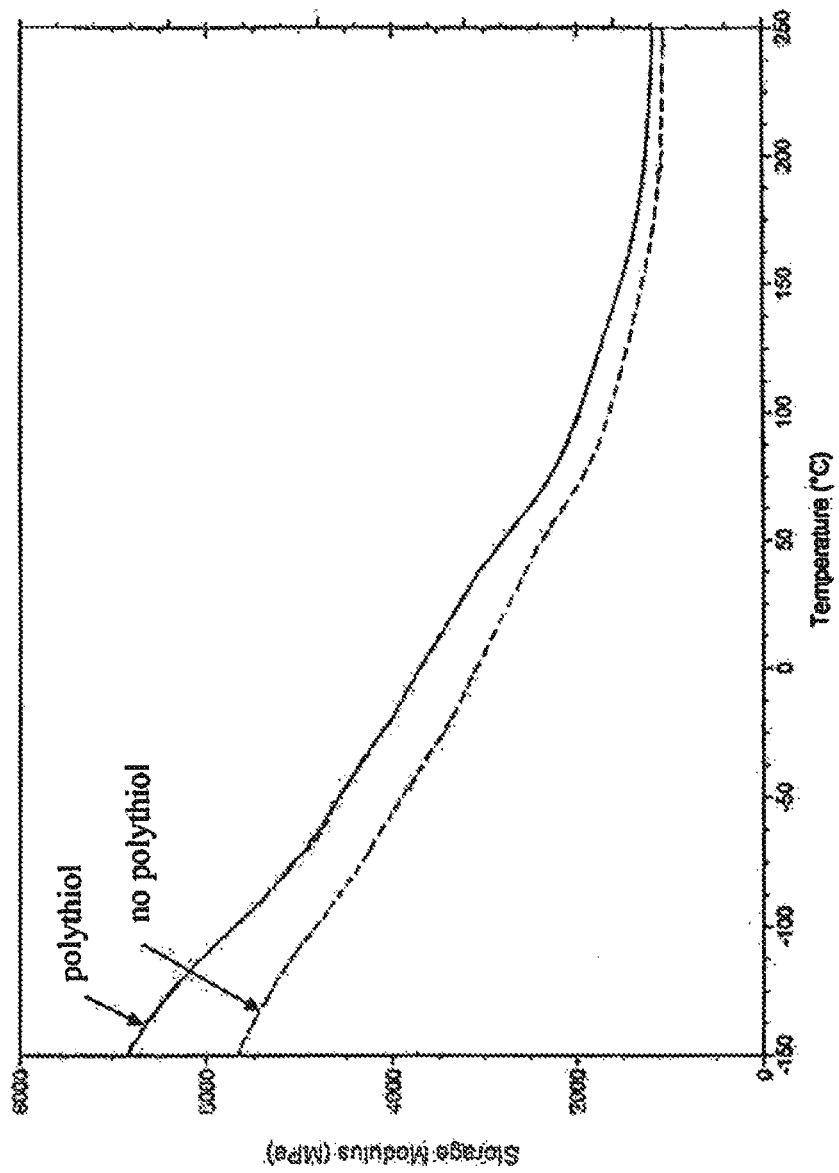
FIGS. 6A, 6B, and 6C, respectively, show improved mechanical properties of increased average storage modulus, increased average loss modulus, and decreased average tan δ measured over a temperature range of −150 degrees C. to 250 degrees C. for a trimethylolpropane triacrylate/tris (2-hydroxy ethyl)isocyanurate triacrylate resin crosslinked with the polythiol pentaerythritol tetra-(3-mercaptopropionate) compared to the same trimethylolpropane triacrylate/tris (2-hydroxy ethyl)isocyanurate triacrylate resin without polythiol.
Figure 6B:
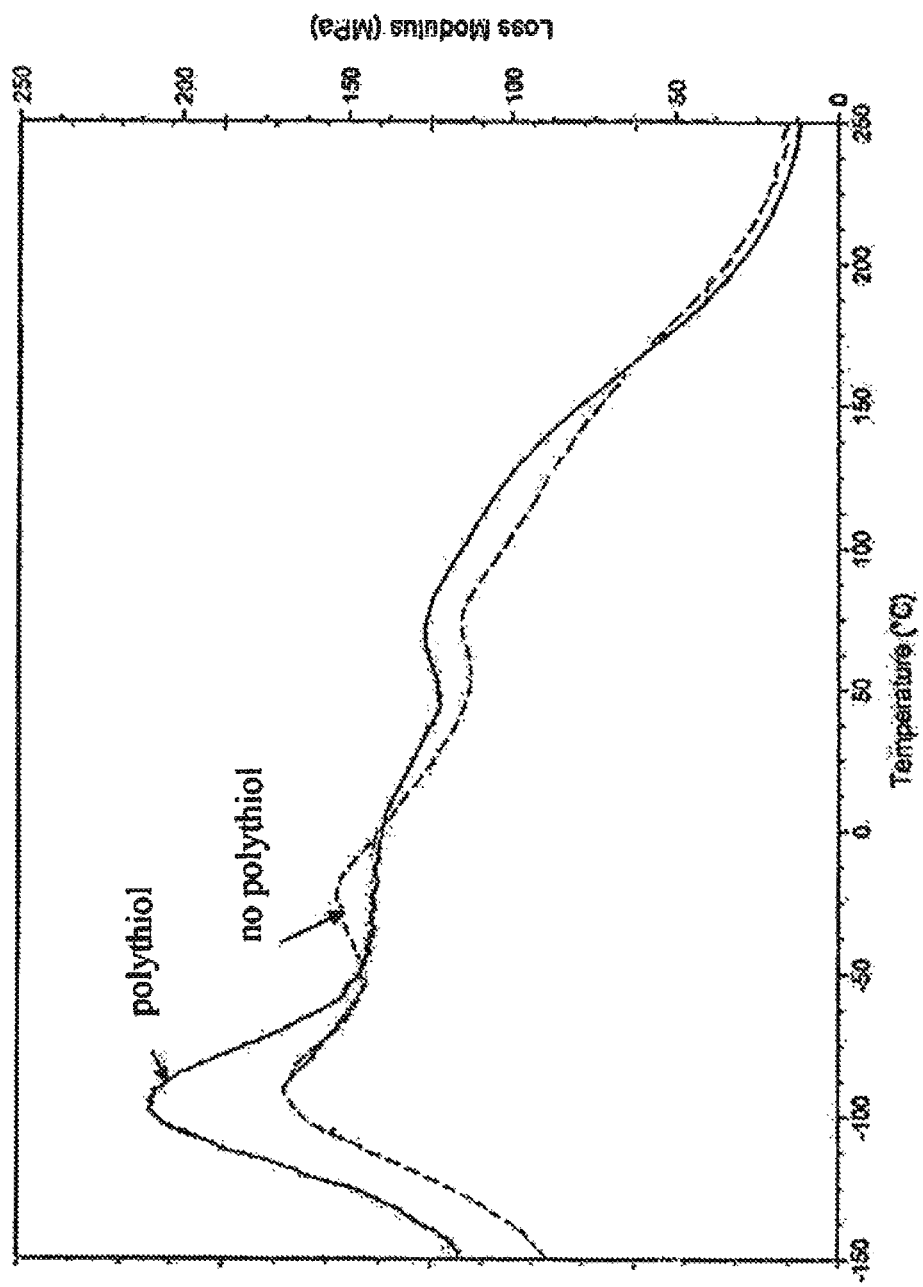
Figure 6C:
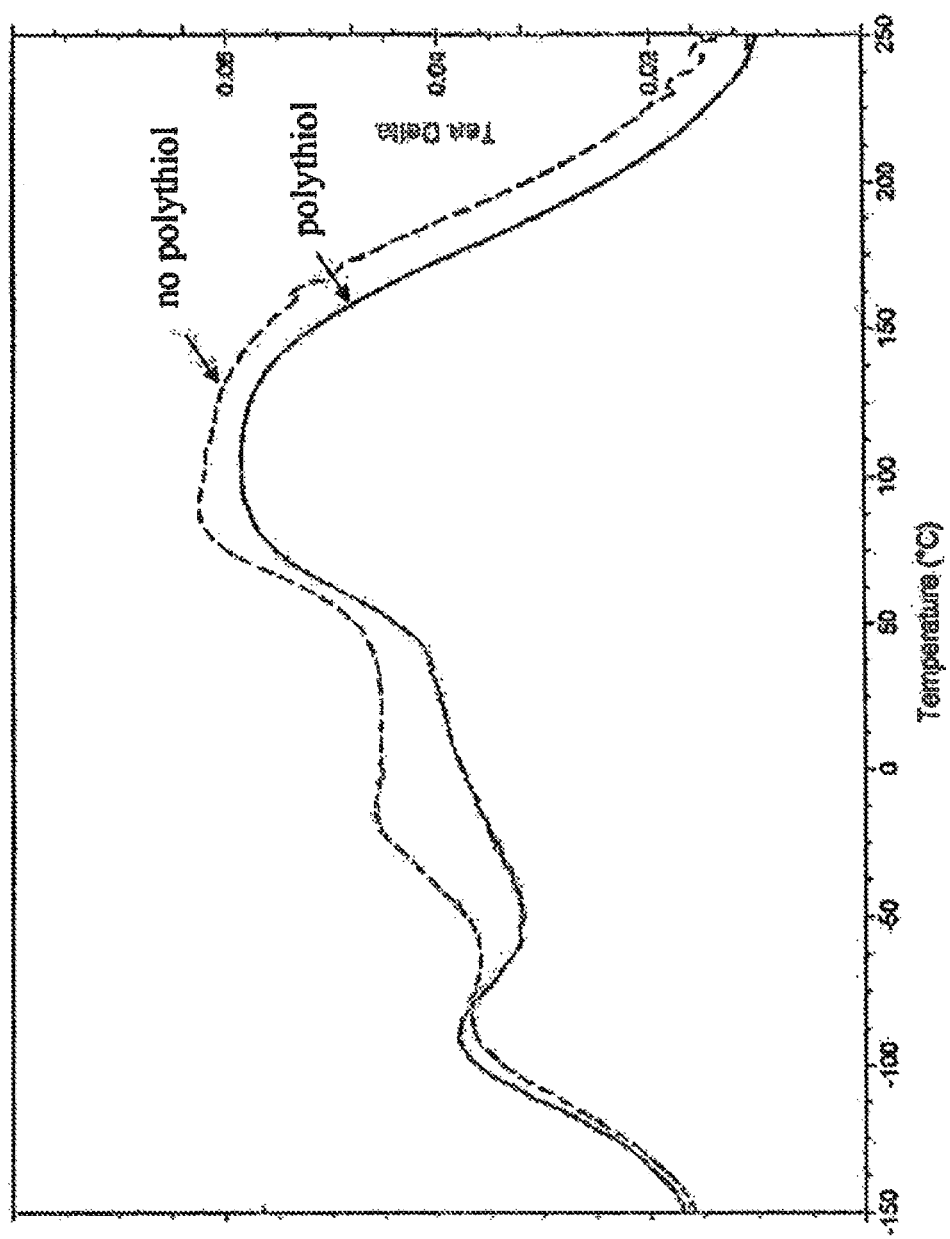

FIGS. 6A, 6B, and 6C, respectively, show improved mechanical properties of increased average storage modulus, increased average loss modulus, and decreased average tan .delta. measured over a temperature range of −150 degrees C. to 250 degrees C. for a trimethylolpropane triacrylate/tris(2-hydroxy ethyl)isocyanurate triacrylate resin crosslinked with the polythiol pentaerythritol tetra-(3-mercaptopropionate) compared to the same trimethylolpropane triacrylate/tris(2-hydroxy ethyl) isocyanurate triacrylate resin without polythiol.

Example 6

The Disclosed Abrasive Products have Improved Finishing Properties

Figure 7:
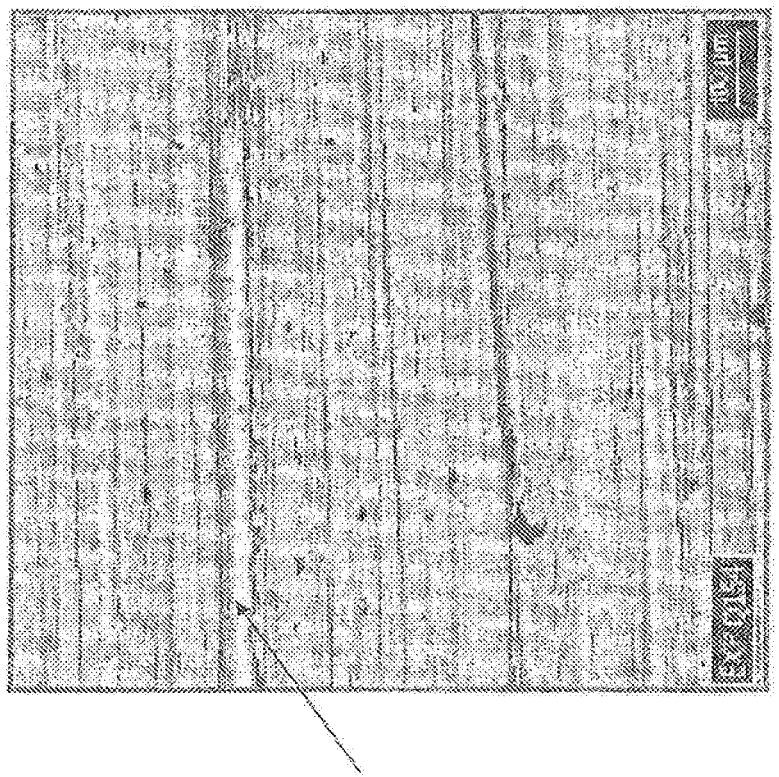
FIG. 7 is a photograph showing an undesirable random scratch in a workpiece finish.

FIG. 7 is a photograph showing an undesirable random scratch in a workpiece finish. Without wishing to be bound by theory, it is believed that such random scratches occur due to poor adhesion of abrasive particles resulting from poor mechanical properties of the resin binder.

Figure 8B:
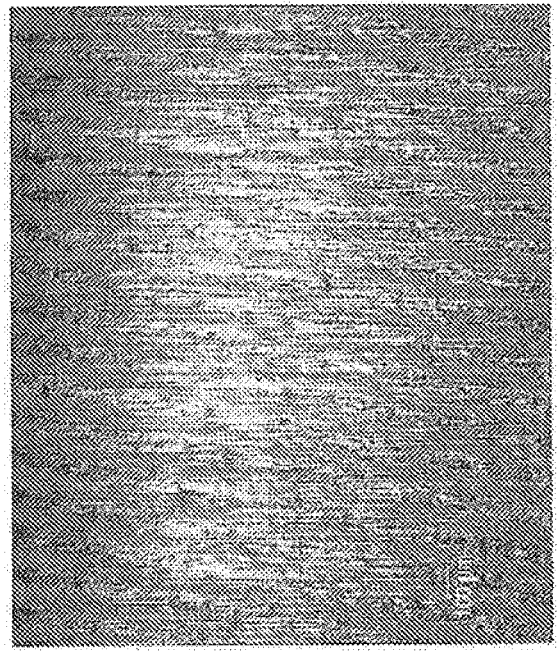
FIGS. 8A and 8B are photographs that show the difference in surface finish of a workpiece between a coated abrasive with 70/30 ratio of trimethylolpropane triacrylate/tris (2-hydroxy ethyl) isocyanurate triacrylate (TMPTA/ICTA resin) crosslinked with the polythiol pentaerythritol tetra-(3-mercaptopropionate) (8A) compared to an abrasive having the same resin without polythiol (8B).
Figure 8A:
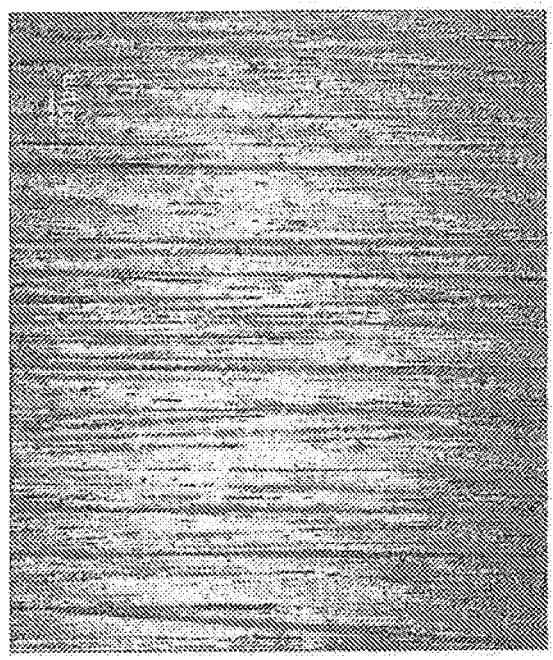

FIGS. 8A and 8B are photographs that show the difference in surface finish of a workpiece between a coated abrasive with (TMPTA/ICTA resin) crosslinked with the polythiol pentaerythritol tetra-(3-mercaptopropionate) (8A) compared to an abrasive having the same resin without polythiol (8B). As can be seen, the polythiol abrasive appears to have a smoother finish with fewer deep random scratches.

This apparent difference can be quantified. In particular, the polythiol abrasive has improved (reduced) values for surface roughness parameters Ra, Rz, and Rt, as shown in Table 1.

TABLE 1

| Abrasive Product | Ra | Rz | Rt |
|---|---|---|---|
| Polythiol | 0.31 | 2.87 | 3.95 |
| No polythiol | 0.90 | 4.47 | 9.22 |

The surface roughness parameters are measured over an assessment length comprising a straight path taken by a probe (e.g., a mechanical or optical probe) that measures variation in the surface. Ra is the average roughness value over the assessment length on the surface, which describes the average peak height and valley depth or average amplitude of a surface. Rz is an ISO 10 point height parameter, which describes the height difference between the 5 highest peaks and 5 lowest valleys in the assessment length. Rt is a measure of roughness maximum or "topmost roughness" relating the difference between the highest peak and the lowest valley over the entire assessment length.

Example 7

The Disclosed Abrasive Products have Improved Durability

Figure 9A:
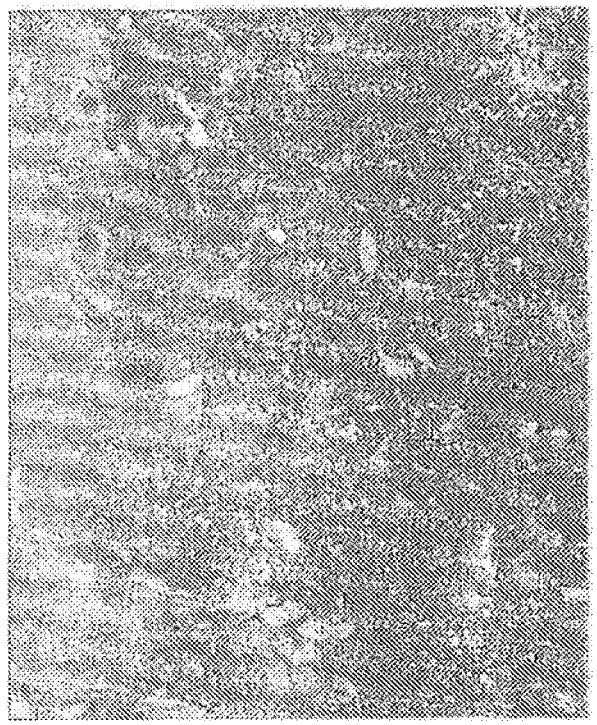
FIGS. 9A and 9B are photographs of coated abrasives after identical use conditions.
Figure 9B:
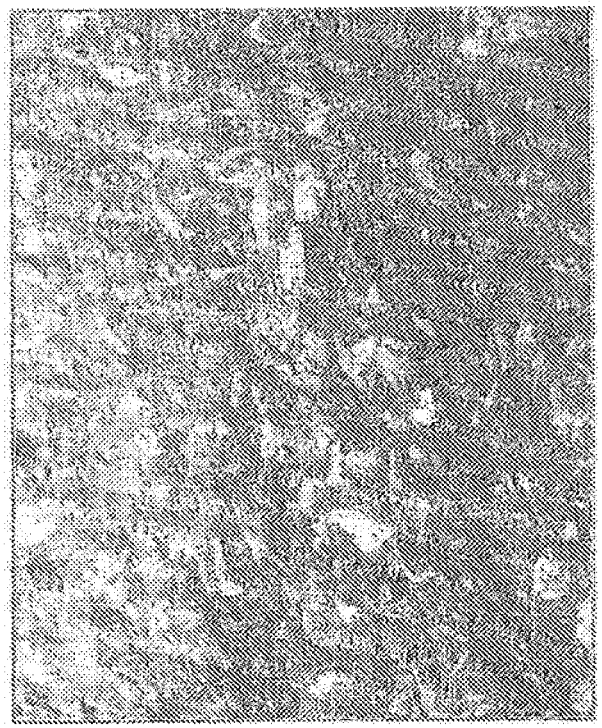

FIGS. 9A and 9B are photographs of coated abrasives after identical use conditions. FIG. 9A is a photograph of a coated abrasive with (TMPTA/ICTA resin) crosslinked with the polythiol pentaerythritol tetra-(3-mercaptopropionate); FIG. 9B a photograph of an abrasive having the same resin without polythiol. As can be seen, the resin without polythiol is comparatively rougher and more degraded, with many apparently loosened or missing abrasive grains compared to the coated abrasive with polythiol.

While this invention has been particularly shown and described with references to preferred embodiments thereof, it will be understood by those skilled in the art that various changes in form and details may be made therein without departing from the scope of the invention encompassed by the appended claims. Further, each U.S. patent previously identified above has its teachings incorporated herein.

Example 8

The Disclosed Abrasive Products have Improved Flexibility and Adhesion

The polythiol modifier (PTM) modified coated abrasive structures were evaluated for flexibility, peel strength and adhesion in this example. Test samples were prepared under the same process conditions, maintaining coat weights constant, while varying the amount of PTM in either the make or size layer from 0 to 10%, as detailed below.
PTM Coated Abrasive Composition and Process
Coated abrasive structures for the flexibility and adhesion tests were produced by coating a continuous web of finished cloth with 24 pounds per ream (330 ft$^2$) of a phenol formaldehyde make formulation which containing 5.70% PTM. All components and corresponding levels are detailed in Table 2. The web with the make coat was then followed by an electrostatic deposition process applying 32 pounds per ream of a BFRPL aluminum oxide grain. This partial structure of make coated web and grain was then dried in an oven for two hours at 80° C. to impart drying and them B-staging of the phenol formaldehyde prepolymer.

TABLE 2

PTM Modified Make Formulation

| Make Formulation Component | Vendor | Percentage |
|---|---|---|
| Filler NYAD Wollast 325 | NYCO | 34% |
| Wet Witcona 1260 | Witco | 0.10% |
| Resin, Single Comp 94-908 | Durez | 57% |
| Nalco 2341 Defoamer | Nalco | 0.10% |
| PET-3MP (PTM) | Bruno Bloc | 5.70% |
| Water | — | 3.10% |

The coated abrasive structures were then coated with 13 pounds per ream of a phenol formaldehyde size coat. The detailed composition of the size coat is presented in Table 3. The web was again transported through a drier which had a dry bulb temperature setting of 120° C. for a period of two hours.

TABLE 3

PTM Modified Size Formulation Size Formulation

| Size Formulation Component | Vendor | Percentage |
|---|---|---|
| White Dye E-8046 | Acrochem Corp | 0.70% |
| Wet Witcona 1260 | Witco | 0.20% |
| Solmod Tamol 165A | Rohm & Haas | 0.90% |
| Filler Syn Cryolite | Solvay | 42.40% |
| Resin Single Comp 94-908 | Durez | 48.30% |
| Nalco 2341 Defoamer | Nalco | 0.10% |
| PET-3MP Polythiol (PTM) | Bruno Bloc | 2.50% |
| Dye Unisperse Black | Ciba | 0.20% |
| Water | — | 4.80% |

The material was then wound onto a core which forms a roll. The roll of coated abrasive product was then placed into a large convection oven to undergo a post curing step in which the oven temperature was 125° C. for 12 hours.

Flexibility, Adhesion and Peel Tests

Flexibility was ascertained using a Frank Stiffness meter available from Karl Frank in Germany. This test measured the amount of force required to bend the sample between 10 degrees to 60 degrees in 5 degree increments. The slope of a plot of % force (y-axis) versus angle (x-axis) for each sample yields what is known as the as the "Flex Slope." The higher the flex slope generally indicates a stiffer product. Three (3) test sample pieces, each of which was 1" wide.times.3" long, were used.

Peel force was determined through the use of an Instron Tensile tester. For this mechanical property, the coated abrasive web was bonded to another member of equal stiffness through the use of a high strength, two part epoxy adhesive. The force required to adhesively separate the make coat layer from the backing material was measured through a constraint T-peel on an Instron Tensile tester with a cross head speed of 1.00 inch per minute. The ratio of the peel force to flex slope was a measure of the adhesive strength of the make coat to finished cloth coating substrate, where greater values represented greater adhesion.

Data generated from the Frank Stiffness and Instron Peel Tests are presented in Table 4. From this table the average flex slope for 0% PTM sample was 1.26 with an average peel to flex ratio of 21.1. With 5% addition of PTM to the make coat, the flex slope decreased by 11% with a corresponding increase in the peel to flex ration to 23.0 or 10%. Therefore the increase in product flexibility was observed with a corresponding increase in peel adhesion. This was unexpected, because typically the more flexible product possesses lower peel adhesion values. Incremental addition of PTM to the size layer did not significantly affect the flexibility or adhesion properties of the structure. These results indicate that the presence of PTM in the make layer can significantly improve a coated abrasive's flexibility while simultaneously improving the interfacial adhesion between the make and backing layer.

TABLE 4

Effect of PTM on flex slope and peel strength values.

| Test # | Flex Slope | Make PTM | Size PTM | Peel | Peel to Flex |
|---|---|---|---|---|---|
| 1 | 1.38 | 0 | 0 | 25.91 | 18.78 |
| 2 | 1.14 | 0 | 0 | 25.72 | 22.56 |
| 3 | 1.27 | 0 | 0 | 28.21 | 22.21 |
| 4 | 1.17 | 10 | 0 | NA | NA |
| 5 | 1.17 | 10 | 0 | 25.12 | 21.47 |
| 6 | 1.09 | 10 | 0 | 26.53 | 24.34 |
| 7 | 1.02 | 10 | 5 | 25.42 | 24.92 |
| 8 | 1.05 | 10 | 5 | 27.74 | 26.42 |
| 9 | 1.04 | 10 | 5 | 24.96 | 24.00 |
| 10 | 1.14 | 10 | 10 | 27.08 | 23.76 |
| 11 | 1.09 | 10 | 10 | 24.51 | 22.48 |
| 12 | 1.14 | 10 | 10 | 27.81 | 24.39 |
| 13 | 1.23 | 5 | 0 | 25.35 | 20.61 |
| 14 | 1.21 | 5 | 0 | 26.05 | 21.53 |
| 15 | 1.23 | 5 | 0 | 26.18 | 21.28 |
| 16 | 1.14 | 5 | 5 | 26.85 | 23.55 |
| 17 | 1.18 | 5 | 5 | 24.99 | 21.17 |
| 18 | 1.21 | 5 | 5 | 25.57 | 21.13 |
| 19 | 1.21 | 5 | 10 | 2383 | 19.69 |
| 20 | 1.17 | 5 | 10 | 23.94 | 20.46 |
| 21 | 1.2 | 5 | 10 | 25.58 | 21.32 |

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. An abrasive article comprising:
a substrate;
a crosslinked polymer composition deposited on the substrate; and
abrasive particles disposed on or in the crosslinked polymer composition, wherein the crosslinked polymer composition comprises
the reaction product of a resin and a polythiol group, wherein the resin is a phenol formaldehyde resole resin, and wherein the polythiol group is selected from trimethylolpropane tri(3-mercaptopropionate), trimethylolpropane tri(2-mercaptoacetate), pentaerythritol tetra(3-mercaptopropionate), pentaerythritol tetra(2-mercaptoacetate), polyol-3-mercaptopropionates, polyol-2-mercaptoacetates, polyester-3-mercaptopropionates, polyester-2-mercaptoacetates, and ethoxylated trimethylolpropane tri(3-mercaptopropionate).

2. The abrasive article of claim 1, wherein the polythiol group is pentaerythritol tetra-(3-mercaptopropionate).

3. The abrasive article of claim 1, further comprising aluminum trihydrate, wollastonite, cryolite or combinations thereof disposed on or in the crosslinked polymer composition.

4. The abrasive article of claim 1, wherein the polythiol group forms at least 10% by weight of the crosslinked polymer composition.

5. The abrasive article of claim 1, wherein the polythiol group forms about 10% to about 50% by weight of the crosslinked polymer composition.

6. The abrasive article of claim 1, wherein the crosslinked polymer composition comprises the reaction product of the resin, the polythiol group, and an epoxy acrylate.

7. The abrasive article of claim 1, further comprising a colorant.

8. The abrasive article of claim 7, wherein the colorant is fluorescent red, orange, yellow, or green.

9. The abrasive article of claim 1, wherein the crosslinked polymer composition transmits more visible light compared to the same crosslinked polymer composition without the polythiol group.

10. The abrasive article of claim 1, wherein the crosslinked polymer composition has an increased average storage modulus in a temperature range from about −150 degrees C. to 250 degrees C. compared to the same resin without the polythiol group.

11. The abrasive article of claim 1, wherein the resin has an increased average loss modulus in a temperature range from about −150 degrees C. to 250 degrees C. compared to the same resin without the polythiol group.

12. The abrasive article of claim 1, wherein the abrasive article has an increased flexibility of at least 5% compared to an otherwise identical abrasive article not cured with a polythiol.

13. The abrasive article of claim 12, wherein the abrasive article further has increased interfacial adhesion strength of at least 5% compared to an otherwise identical abrasive article not cured with a polythiol.

14. A method of forming an abrasive article comprising:
disposing a curable composition on a substrate;
disposing abrasive particles on or in the curable composition; and
curing the curable composition to form the abrasive article,
wherein the curable composition comprises
a resin and
a polythiol group,
wherein the resin is a phenol formaldehyde resole resin, and wherein the polythiol group is selected from trimethylolpropane tri(3-mercaptopropionate), trimethylolpropane tri(2-mercaptoacetate), pentaerythritol tetra(3-mercaptopropionate), pentaerythritol tetra(2-mercaptoacetate), polyol-3-mercaptopropionates, polyol-2-mercaptoacetates, polyester-3-mercaptopropionates, polyester-2-mercaptoacetates, and ethoxylated trimethylolpropane tri(3-mercaptopropionate).

* * * * *

UNITED STATES PATENT AND TRADEMARK OFFICE
CERTIFICATE OF CORRECTION

| | | |
|---|---|---|
| PATENT NO. | : 9,023,955 B2 | Page 1 of 1 |
| APPLICATION NO. | : 14/329306 | |
| DATED | : May 5, 2015 | |
| INVENTOR(S) | : Anthony C. Gaeta et al. | |

It is certified that error appears in the above-identified patent and that said Letters Patent is hereby corrected as shown below:

ON THE TITLE PAGE
Item (56), please insert the following U.S. Patent Documents:

--5108463 04/1992 Buchanan
5137542 08/1992 Buchanan et al.
5254194 10/1993 Ott et al.
5328716 07/1994 Buchanan
5378251 01/1995 Culler et al.
5378252 01/1995 Follensbee
5417726 05/1995 Stout et al.
5505747 04/1996 Chesley et al.
5560753 10/1996 Schnabel et al.
5565011 10/1996 Follett et al.
5573619 11/1996 Benedict et al.--

Signed and Sealed this
Fifth Day of January, 2016

Michelle K. Lee
*Director of the United States Patent and Trademark Office*